United States Patent
Hartzler

[11] 3,717,619
[45] Feb. 20, 1973

[54] TETRATHIOOXALATE POLYMERS AND THEIR PREPARATION

[75] Inventor: Harris D. Hartzler, Wilmington, Del.

[73] Assignee: E. I. du Pont de Nemours and Company, Wilmington, Del.

[22] Filed: April 22, 1971

[21] Appl. No.: 136,575

[52] U.S. Cl. ............260/79, 260/23 R, 260/28.5 B, 260/41.5 R, 260/79.1, 260/79.5 C, 260/890
[51] Int. Cl. .............................................C08g 23/00
[58] Field of Search..............................260/78, 79.1

[56] References Cited

UNITED STATES PATENTS 3,234,187  2/1966  Proskow..................................260/79

Primary Examiner—Donald E. Czaja
Assistant Examiner—Melvyn I. Marquis
Attorney—James A. Costello

[57] ABSTRACT

Disclosed herein are tetrathiooxalate polymers having repeating units of the structure

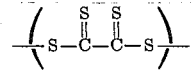

a process for making said polymers comprising preparing an alkali metal tetrathiooxalate precursor and treating the precursor with an oxidizing agent to polymerize the polymers; and the use of said polymers in the vulcanization of rubber.

7 Claims, No Drawings

TETRATHIOOXALATE POLYMERS AND THEIR PREPARATION

BACKGROUND OF THE INVENTION

1. Field of the Invention

This invention relates to novel polymers comprised principally of carbon and sulfur and to the making and use of these polymers.

2. Description of the Prior Art

Polymeric forms of carbon disulfide described by Bridgman (Proc. Am. Acad. Arts and Sci., 74, 413, 1942) have been shown by Whalley, Can. J. Chem. 38, 2105, 1960, to be made up of linear chains of alternating carbon and sulfur atoms in the following unit, repeated indefinitely,

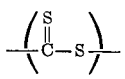

The polymer is made by the application of extremely high pressures to liquid $CS_2$.

Proskow, U. S. 3,234,187, discloses making a different polymer containing dithietane ring structures of alternating carbon and sulfur atoms such as

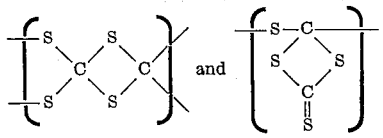

by starting from the compound

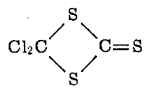

The preparation of sodium tetrathiooxalate from $CS_2$ and sodium-mercury amalgam is disclosed by B. Fetkenheuer, Chem. Ber. 60, 2528 (1927). There is no recognition in this reference that the sodium tetrathiooxalate is anything more than a salt of a dibasic acid. It is, in fact, as has now been found and described herein, a precursor (monomer) for a new and novel tetrathiooxalate polymeric composition when treated according to the teaching of this invention.

SUMMARY OF THE INVENTION

The novel tetrathiooxalate polymer compositions of this invention comprise sulfur and carbon in a ratio of from about 1.2:1 to 2:1, sulfur:carbon. The polymer is characterized in that substantial amounts of the carbon is present in dithiooxalyl segments,

The polymer is also characterized by repeating units of the structure

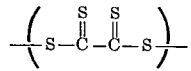

The polymer compositions are brown solids stable in air to temperatures of about 130°C, at which temperatures they begin to decompose. The polymers are only slightly soluble in water or in the common organic solvents. They are stable toward mineral acids but are degraded by strong bases and strong oxidizing agents.

The infrared spectrum is characterized by a strong absorption at 1060 cm$^{-1}$, attributed to the C=S stretching frequency, and a weaker absorption at 720 cm$^{-1}$.

Were the entire polymeric composition to be constituted solely of units of the structure

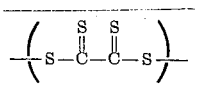

the ratio of sulfur to carbon would be 2:1 and all the dithiooxalyl groups

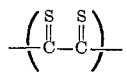

would be joined by disulfide bonds.

However, in the course of polymerization of the tetrathiooxalate precursor by oxidation, sulfur may be lost from the polymer resulting in some departure from the depicted prototype structure. The primary way in which lower sulfur is accommodated in the polymer is believed to be in the re-placement of some of the disulfide links by monosulfide links separating the dithiooxalyl segments. In this manner, all carbon is still present in dithiooxalyl groups and the S/C ratio is at least 1.5.

An additional loss of sulfur from the polymer may result, inter alia, from vigorous oxidizing conditions. It is certain, however, that even with a S/C ratio as low as 1.2, the polymer compositions will contain substantial amounts of the characteristic dithiooxalyl groups and substantial amounts of the characteristic tetrathiooxalate groups.

Although the novel tetrathiooxalate polymers contemplated herein may contain a sulfur/carbon ratio as low as 1.2, it is preferred that the ratio be at least 1.5., and most preferably about 2.

The novel process for making the tetrathiooxalate polymer composition comprises reacting carbon disulfide with an alkali metal reductant to form an alkali metal tetra-thiooxalate precursor (monomer) which is then treated with an oxidizing agent.

The general equation for preparing the precursor is

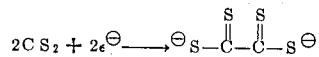

DETAILS OF THE INVENTION

The alkali metal reductant is an aromatic hydrocarbonalkali metal addition complex. This reductant provides an ether soluble complex having a high concentration of effective reducing agent available for homogeneous reaction with the carbon disulfide. It is preferred that the reductant be a naphthalene-sodium addition complex.

The preferred naphthalene anion radical can be replaced in whole or in part by anthracene, 1,1-diphenyl-ethylene or other aromatic hydrocarbons with reduction potentials above that of carbon disulfide. Other nonreactive solvents can be used, particularly ethers such as dioxane and dimethoxyethane. The preferred alkali metal is sodium although others, especially potassium, may be employed.

The reaction is most conveniently carried out by using slightly more than an equimolar amount of naphthalene compared to sodium, as well as slightly more than an equimolar quantity of carbon disulfide so that the more reactive reducing agents are discharged before the product is recovered.

The oxidizing agents operable to polymerize the tetrathiooxalate precursors are those generally known to convert mercaptans or mercaptan salts to disulfides, and include the halogens, hypochlorites, hydrogen peroxide, air, and higher valent metals such as $Ce^{+4}$ and $Pb^{+4}$. The oxidizing agent should be strong enough so that polymerization occurs without undue delay. However, high concentrations of very strong oxidants should be avoided since the polymer may then undergo further oxidation whereby the S/C ratio of the polymer may be reduced to, say, 1.2 which is somewhat below the preferred minimum value of 1.5. Thus, bromine is preferred over chlorine as an oxidant and it is preferred to add the oxidant gradually to a solution of the tetrathiooxalate monomer. It is desirable to select an oxidizing agent which is soluble in the polymerization solvent and which yields soluble reduction products.

As polymerization proceeds, the tetrathiooxalate polymer precipitates from the solvent and is recovered by filtration. The polymer is obtained in relatively pure form by precipitation from the solvent, usually water, in which the monomer, and preferably the oxidizing agent as well, are soluble. Water is the preferred medium for the oxidation since it is an effective solvent for the tetrathiooxalate precursors as well as for the contemplated oxidizing agents, while it has low solubility for the tetrathiooxalate polymers. Alcohols, acetonitrile and dimethoxyethane are also operable solvents for the reaction.

Small amounts of materials other than carbon and sulfur may be present in the novel polymeric compositions. For instance, hydrogen, oxygen and alkali metals may be present as an inherent result of terminating the polymerizing chain. Thus, when polymerization proceeds from, say, the sodium or potassium monomer, sodium or potassium cations may be present. It is also possible that some hydrogen and/or oxygen may be present in the polymeric composition when an aqueous solution is utilized as the solvent for the reactants. Foreign materials may also derive from the oxidizing agents that are employed. Because of difficulty of removal, some of these foreign materials may be occluded within the novel polymeric compositions.

Elevated temperatures are not generally necessary in the process of this invention, and the reactions can conveniently be carried out in the range from somewhat below ambient conditions to over 100°C where decomposition of the product might be limiting.

The polymers show some variations in thermal behavior depending upon the degree of purity and presumably upon the degree of cross-linking that may occur with variations in preparative procedure. While relatively sharp "melting points" at temperature of about 160°C may be observed by rapid heating, slow heating procedures indicate some decomposition at temperatures of about 130°C or lower.

After recovering the solid polymer by filtering the polymerization solution, it may be further purified by washing with a solvent such as methylene chloride or carbon disulfide to remove sulfur that may be present as a result of some oxidative degradation. The solid polymer may also be digested with mineral acid, preferably HCl at room temperature for several hours to convert terminal groups such as $-C(S)-S^--Na^+$ to the acid form, $-C(S)-SH$.

The recurrent group

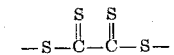

which characterizes the polymers of this invention is assured by preparation from the corresponding tetrathiooxalate monomers by reactions known to form S-S bonds. The perseverance of this group intact in the polymers is demonstrated by cleavage of the polymers to form characteristic dithiooxalyl fragments,

In addition to the C—S and C=S bonds found in the known carbon/sulfur polymers these compositions contain the relatively more stable C—C bonds as well as the relatively labile S—S bonds.

Confirmation of the fact that the two carbon disulfide molecules are joined by a carbon-carbon bond rather than by a carbon-sulfur bond is provided by the nmr spectrum of a hydrogen-containing derivative. Thus the dimethyl ester of tetrathiooxalic acid was prepared from the sodium salt by conventional techniques and found to have a single nmr absorption peak corresponding to only one type of methyl group. The position of the absorption peak (chemical shift, $\delta =$ 2.72) is consistent with a methyl group attached to sulfur, not carbon. This indicates the structure

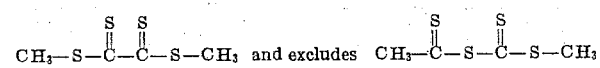

Tetrathiooxalate precursors useful in the practice of this invention may also be produced by other methods. For example, polarographic reduction of carbon disulfide occurs at −1.53 volts (in relation to the standard calomel electrode) in acetonitrile solution with tetrabutylammonium perchlorate as supporting electrolyte. Thus, alkali metal, ammonium or tetraalkylammonium salts of tetrathiooxalic acid may be prepared by electrolytic reduction.

PREFERRED EMBODIMENTS

The following examples are intended to illustrate but not to limit the invention.

EXAMPLE 1A

This example shows the most preferred method for preparing the sodium tetrathiooxalate, $Na_2C_2S_4$, precursor of this invention.

A solution of 13 g of naphthalene in 100 ml of anhydrous, peroxide-free tetrahydrofuran was stirred under nitrogen at room temperature. Freshly cut sodium (2.3 g in about 10 pieces) was added to the solution. The deep green color of the naphthalene anion radical developed. The system was stirred 4 hours. Carbon disulfide (10 ml) was added. An exothermic reaction occurred and a brown solid formed. The green color of the anion radical was discharged. Filtration gave 7.03 g of brown sodium tetrathiooxalate. The filtrate was evaporated to dryness. The residue was stirred with ether to dissolve the naphthalene and refiltered to give an additional 2.88 of brown sodium tetrathiooxalate.

EXAMPLE 1B

This example shows the preparation of the tetrathiooxalate polymer of this invention from a sodium tetrathiooxalate precursor prepared as described in Example 1A. Four grams (4.0) of the tetrathiooxalate precursor was dissolved in 50 ml of water and the solution was filtered to insure homogeneity. The solution was stirred at room temperature while a solution of 3.5 g of bromine of 125 ml of water was added dropwise. The solution lightened in color and a brown solid separated. The mixture was filtered and the solid was rinsed with water (25 ml), ethanol (3 × 40 ml), and ether (3 × 50 ml). The residual solid (0.77 g) was a light brown amorphous powder which decomposed at 116°–167°C after darkening around 80°C. Analysis showed 79.77 percent sulfur and 17.85 percent carbon (a S/C ratio of 1.68). An infrared spectrum of the product showed only two absorptions, at 1060 cm$^{-1}$ (C=S) and at 720 cm$^{-1}$.

A similarly prepared sample that was analyzed for bromine was found to contain about 1.58 percent bromine by weight.

Confirmation of Dithiooxalyl Structure By Amination

The dithiooxalyl structure of the polymer was confirmed by the cleavage of a similarly prepared sample with ammonia. A mixture of 4.5 g. of poly-tetrathiooxalate in 50 ml concentrated ammonium hydroxide was stirred under nitrogen and heated at 50°C for 24 hours. The mixture was cooled and extracted with 5 × 50 ml of methylene chloride. Upon evaporation of the methylene chloride there was recovered a small amount (0.12 g) of sulfur. The aqueous suspension was filtered to give 2.32 g of brown solid. This solid was sublimed at 100°C and 0.5 mm pressure to give 152 g (42%) of yellow-brown dithiooxamide. The dithiooxamide decomposed around 180°C after extensive sublimation at 170°–175°C. An infrared spectrum of the product was identical to that of an authentic sample of dithiooxamide,

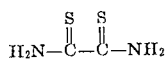

Thus, the novel compositions are cleaved by ammonia to form dithiooxamide.
Utility The utility of the polymer as an accelerator for the curing of rubber was shown by blending at various concentrations (0.05 to 2 percent) in a standard Neoprene W stock. The tetrathiooxalate polymers produced a rapid cure at 307°F (ASTM oscillating disc rheometer test D–2705–68T) yielding a good quality rubber as judged by stress-strain characteristics (ASTM test D–412) and Shore hardness (ASTM test D–2240).

A typical black rubber stock in which the novel compositions are successfully employed is compounded as follows:

| Material | Parts |
|---|---|
| Chloroprene Rubber (Neoprene W) | 100.0 |
| Stearic acid | 0.5 |
| Magnesia | 4.0 |
| Antioxidants | 3.0 |
| Carbon black | 100.0 |
| Light processing oil | 10.0 |
| Paraffin wax | 1.0 |
| Zinc oxide | 5.0 |
| Accelerator (novel tetrathiooxalate polymer) | 2.0 |
| | (ca 0.9%) |
| Total Parts | 225.5 |

The specific embodiments of the invention in which an exclusive property or privilege is claimed are defined as follows:

1. A tetrathiooxalate polymer composition comprising sulfur and carbon in a ratio of from about 1.2:1 to 2:1, sulfur:carbon,
the polymer characterized in that substantial amounts of the carbon is present in dithiooxalyl segments,

wherein presence of the dithiooxalyl segments is confirmed by cleavage of the polymer composition with ammonia to form dithiooxamide,
the polymer further characterized by repeating units of the structure

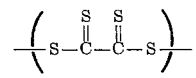

2. A composition according to claim 1, wherein the ratio of sulfur to carbon is from about 1.5:1 to 2:1.

3. A process for making the polymer of claim 1, comprising reacting carbon disulfide with an aromatic hydrocarbon-alkali metal addition complex reductant, forming an alkali metal tetrathiooxalate precursor thereby, and treating the precursor with an oxidizing agent.

4. A process according to claim 3, wherein the alkali metal is sodium.

5. A process according to claim 3, wherein the aromatic hydrocarbon is naphthalene.

6. A process according to claim 3, wherein the oxidizing agent is bromine.

7. A process for making the polymer of claim 1, comprising reacting carbon disulfide with a naphthalene sodium addition complex, forming a sodium tetrathiooxalate precursor thereby, and oxidizing the precursor with bromine.

* * * * *